May 24, 1955    H. W. BLACKWELL    2,708,952
RADIAL ARM TYPE MOUNTING FOR POWER DRIVEN SAWS
Filed July 8, 1953      2 Sheets-Sheet 2
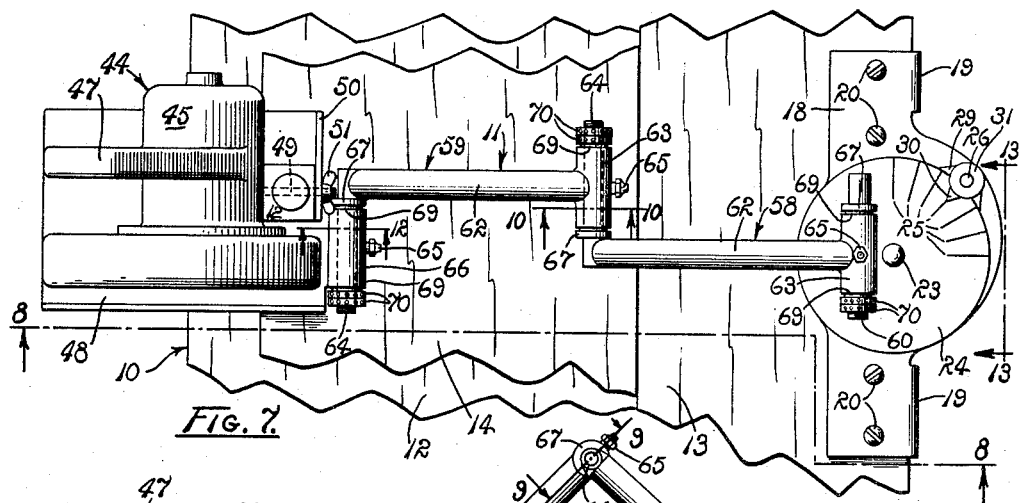
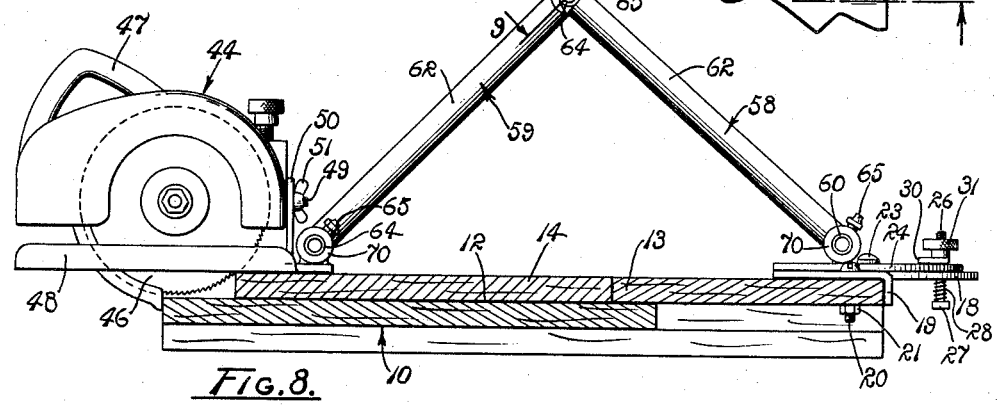
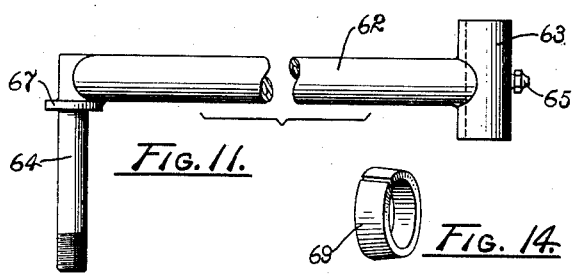
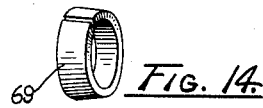
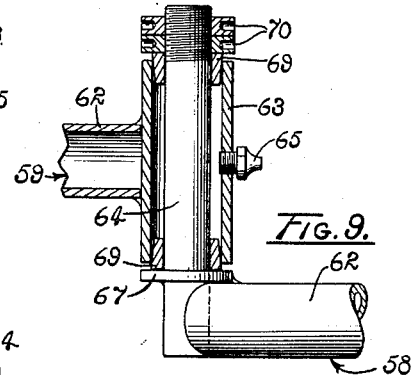
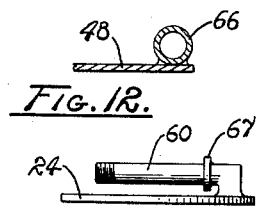
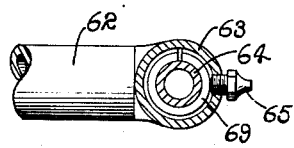
HOMER W. BLACKWELL
INVENTOR
HUEBNER, BEEHLER,
WORREL & HERZIG
ATTORNEYS United States Patent Office 2,708,952
Patented May 24, 1955

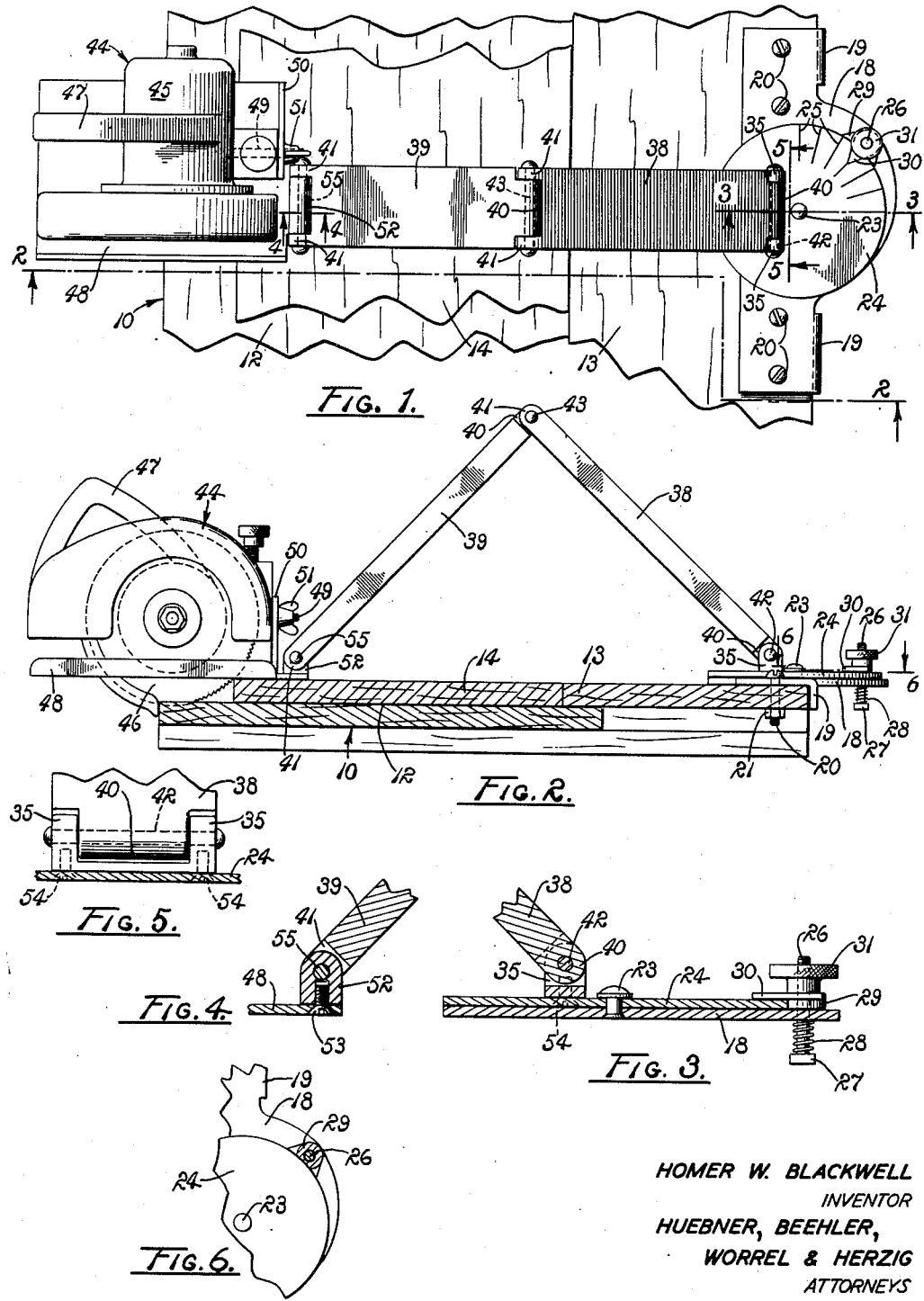

2,708,952
RADIAL ARM TYPE MOUNTING FOR POWER DRIVEN SAWS

Homer W. Blackwell, Fresno, Calif.

Application July 8, 1953, Serial No. 366,810

5 Claims. (Cl. 143—6)

The present invention relates to mountings for power driven saws and more particularly to such a mounting for motor driven saws of the hand manipulated type adapted to guide such saws in movement to and from work piece engagement as well as along a line of work piece traversal in predetermined angular relation to the work piece.

Saw mountings of the general class to which the instant invention relates are popular with contractors, builders, lumber yards, cabinet makers, building custodians and others having need for the cutting of lumber or the like to produce varied mitered or beveled angles thereon. Joining, routing, shaping, rabbeting and other cutting actions involving rectilinear saw movement are readily performed by saws borne by such mountings which are collectively referred to in the trade as "radial saws."

Although radial saws have proved excellently suited to the performance of many cutting operations they have certain concomitant disadvantages which the present invention is believed to relieve or obviate. They are expensive, heavy and portable only with considerable difficulty. Such saws are mounted on work benches and uniformly involve superstructures disposed above the benches for purposes of supporting and guiding the saws in work piece engagement. The superstructures are frequently found to be in the way of full and effective utilization of the work benches.

An object of the present invention is to provide an economical mounting for hand manipulated motor driven saws which makes possible the duplication of almost all functions of radial saws.

Another object is to provide light weight mounting for power driven saws adapted to guide such saws in movement to and from work piece engagement as well as along a line of work piece traversal in predetermined relation to the work piece.

Another object is to provide a saw mounting of the character described in the preceding paragraph which is fully adjustable so as to permit adjustment to any desired line of work piece traversal in predetermined angular relation to the work piece.

Another object is to provide a saw mounting adapted for use on work benches and the like which is retractable from a position over the bench when not in use.

Another object is to obviate the cumbrous superstructures heretofore considered necessary in radial saws.

Another object is to provide a combined motor driven saw and mounting therefor in which the weight of the saw is rested upon work pieces engaged thereby during saw operations to aid in holding such work pieces in desired position.

Another object is to provide a saw mounting of the character described which is conveniently portable and speedily and easily installed on work benches and the like and removed therefrom.

Further objects and advantages will become apparent in the subsequent description in the specification.

Fig. 1 is a fragmentary plan view of a work bench having the mounting of the present invention supported thereon which is connected to a conventional hand manipulated motor driven saw for purpose of guiding the same across a work piece rested on the bench.

Fig. 2 is a section taken on line 2—2 of Fig. 1.

Fig. 3 is a fragmentary enlarged section taken on line 3—3 of Fig. 1.

Fig. 4 is a fragmentary enlarged section taken on line 4—4 of Fig. 1.

Fig. 5 is an enlarged fragmentary section taken on line 5—5 of Fig. 1.

Fig. 6 is a fragmentary horizontal section taken on line 6—6 of Fig. 2.

Fig. 7 is a plan view similar to Fig. 1 but showing a second form of the invention.

Fig. 8 is a section taken on line 8—8 of Fig. 7.

Fig. 9 is an enlarged fragmentary section taken on line 9—9 of Fig. 8.

Fig. 10 is an enlarged section taken on line 10—10 of Fig. 7.

Fig. 11 is a plan view of an arm utilized in the mounting shown in Fig. 7 having a tubular body portion from which a segment has been removed for more compact representation.

Fig. 12 is an enlarged fragmentary section taken on line 12—12 of Fig. 7.

Fig. 13 is an edge elevation of a mounting plate of the present invention as viewed from line 13—13 of Fig. 7 having the elements normally associated therewith removed for illustrative convenience.

Fig. 14 is a perspective of a bearing sleeve employed in the form of the invention shown in Fig. 7.

Referring in greater detail to the drawings:

A work bench is fragmentarily represented at 10 illustrative of benches, tables and the like on which the saw mounting of the present invention indicated at 11 is suitably employed. The work bench provides a substantially rectangular horizontal top along a longitudinal edge of which a fence 13 is mounted so as to receive a work piece 14 thereagainst in predetermined position. A base plate 18 of the mounting 11 is shown mounted in overlaying relation to the edge of the fence 13 disposed adjacent to the longitudinal edge of the bench 10 on which the fence is mounted. While it is generally preferable to mount the base plate on the fence, it will readily be apparent that the fence can be mounted directly on the bench or other support, if preferred. The base plate consists of a substantially rectangular member of sheet steel or the like having a semi-circular central portion. On opposite sides of the semi-circular central portion, flanges 19 are substantially right angularly downwardly extended from the plate. The plate is dependably mounted in position by fitting the flanges against the edge of the fence with the plate rested downwardly thereon and extending bolts 20 downwardly through the fence on the lower ends of which nuts 21 are tightened dependably to secure the plate in position.

A journal post 23 is rigidly extended upwardly from the base plate 18 intermediate opposite ends thereof and a circular mounting plate 24 rotatably mounted thereon in facing engagement with the base plate. The periphery of the mounting plate is conveniently marked to provide means for accurately determining relative mounting plate rotational position on the base plate by protractor gradients 25. A clamping bolt 26 is slidably upwardly extended through the semi-circular central portion of the base plate adjacent to the periphery of the mounting plate. The bolt provides a head 27 in downwardly spaced relation to the plate and a spring 28 mounted on the bolt between the head and the base plate. An arcuate block 29 having a concave edge fitted to the periphery of the mounting plate is slidably mounted on the bolt 26 above the base plate. The block preferably approximates the thickness of the mounting plate but is slightly thinner than the mounting plate for reasons soon to become apparent. A pointer 30 integral with the block is extended therefrom over the mounting plate to aid in reference to the protractor gradients. A knurled knob 31 is screw-threadedly mounted on the bolt. When the knob 31 is released, the mounting plate 24 may be freely rotated on the journal post 23 to any desired position. During such rotation, the arcuate edge of the block 29 maintains the block and the pointer mounted thereon in fixed position as a dependable reference point for the protractor gradients. When the mounting plate is in desired position, the knurled knob 31 is tightened to force the pointer 30 downwardly into clamping engagement with the mounting plate. A pair of ears 35 are rigidly mounted on the mounting plate 24 and upwardly extended therefrom. The ears have substantially horizontal aligned bores therethrough chordally related to the mounting plate.

A pair of arms 38 and 39 are provided of substantially identical form so that they can be interchanged if desired. Each arm is substantially rectangular and formed of steel or other rigid material. Each arm has a single bearing 40 transversely at one end thereof of a length adapted to fit between the ears 35 and a pair of axially aligned bearings 41 at the opposite end thereof spaced substantially the same distance as the spacing of the ears. The first arm 38 has its single bearing 40 disposed between the ears 35 and is pivotally connected to the mounting plate by a pin 42 extended through the bores of the ears and the single bearing thereof. The first arm normally extends upwardly from the mounting plate and the single bearing 40 of the second arm 39 is fitted between the spaced bearings 41 of the first arm, as shown in Fig. 1. A pin 43 is inserted through the spaced bearings 41 of the first arm and the single bearing 40 of the second arm to interconnect the arms for relative hingeable movement.

A hand manipulated saw 44, of well known form, illustrates power driven saws generally suited to mounting on the second arm 39. The saw provides a motor 45 having driven connection to a circular saw blade 46. A handle 47 is provided on the motor 45 in a plane substantially parallel to the plane of the saw blade. The motor is mounted for adjustable pivotal movement on a shoe 48 by a trunnion 49 extended from the motor 45 in parallel relation to the saw blade 46 and the shoe. A bracket 50 is extended upwardly from the shoe and the trunnion is journalled therein. A wing nut 51 is screw-threadedly mounted on the trunnion and serves to clamp the motor and saw blade in adjusted tilted position on the shoe. The saw 44 is of well known form and thus is not described in greater detail.

A bearing 52 of a length corresponding to the lengths of the bearings 40 on the arms 38 and 39 is rigidly mounted on the shoe 48 in substantially parallel relation thereto and in right angular relation to a plane normal to the shoe 48 passed through the trunnion 49. As best shown in Figs. 3 and 4, the bearing 52 and the ears 35 may provide flat bases rested downwardly on their respective shoe 48 and mounting plate 24 and be rigidly secured thereto by flat headed bolts 53 and 54 respectively extended upwardly through the respective members on which they are mounted and screw-threadedly engaged therein. The end of the second arm 39 providing the spaced bearings 41 is pivotally coupled to the saw 45 by the fitting of the spaced bearings to opposite ends of the bearing 52 and passing a pin 55 therethrough. It will be noted, that the pins 42, 43 and 55 are in parallel relation and are formed with heads to preclude inadvertent displacement.

Operation

The operation of the device of the present invention is believed to be clearly apparent and is briefly summarized at this point. The base plate 18 is mounted on a bench or the like in the manner described with the articulately interconnected ends of the arms 38 and 39 upwardly extended. The mounting plate 24 is rotated to a predetermined position and the knurled knob 31 tightened to clamp the mounting plate in position. By releasing the winged nut 51, the motor 45 and saw blade 46 can be tilted relative to the shoe 48 to achieve a desired mitering effect. When the motor and saw blade have been located in the desired relation to the shoe 48, the wing nut is again tightened to complete the well known adjustable preconditioning of such saws of the type described for use.

By grasping the handle 47, an operator lifts the saw to the edge of the work piece 14 fitted against the fence 13 oppositely disposed from the fence. The motor 45 is energized in the usual manner and with the shoe 48 rested on the work piece 14 the saw 44 is caused to travel transversely of the work piece along a line precisely predetermined by the adjustment of the mounting plate 24 on the base plate 18. The parallelism of the pins 42, 43 and 55 and their proper fitting to their respective bearings preclude departure of the saw from its predetermined line of work piece traversal. The weight of the saw aids in holding the work piece in position on the bench against the fence and the manual movement of the saw toward the mounting plate further assists in dependably holding the work piece in position.

When the cutting, routing, shaping and rabbeting actions are completed, the saw may be rested on the fence with the arms 38 and 39 collapsed with their articulately connected ends in upwardly extended position.

Second form

The work bench 10, fence 13, work piece 14 and saw 44 are again shown in Figs. 7 and 8 and not again described. Also, the base plate 18 having the mounting plate 24 rotatably mounted thereon is again bolted to the fence in the manner described. The second form of the present invention departs from the first form only in the type of arms 58 and 59 employed and their interconnection of the mounting plate and the saw.

An inverted L-shaped journal 60 is rigidly mounted on the mounting plate with the journal portion thereof in chordal parallel relation thereto, as best shown in Fig. 13.

The arms 58 and 59 are substantially identical and each have an elongated tubular body portion 62 providing a sleeve 63 transversely disposed at one end thereof and extended therefrom to opposite sides and a journal 64 laterally extended from the opposite end of the body portion in parallel relation to the sleeve. Lubrication fittings 65 are provided on the sleeves 63, if desired, as shown. A sleeve 66 similar to the sleeve 63 is rigidly mounted, as by welding, on the forward end of the shoe 48 axially parallel to the shoe and right angularly related to a plane extended through the trunnion 49 normal to the shoe.

As best shown in Figs. 9, 11 and 13, the journals 60 and the journal 64 each have a thrust washer 67 rigidly mounted in circumscribing relation thereto adjacent to the supported end of the respective journals.

In assembling the second form of the invention, a frusto-conical thrust bearing 69 is rotatably fitted over the journal 13, the sleeve 63 of the first arm 58 is slid over the journal and fitted on the thrust bearing, a second thrust bearing is fitted into the opposite end of the sleeve, and a pair of lock nuts 70 are screwthreadedly tightened on the journal to hold the thrust bearings and sleeves in position. It will be apparent, that by tightening or loosening the nuts, the resistance to pivotal movement of the first arm on the mouning plate can be somewhat adjusted. They should be sufficiently tight that the thrust bearings preclude play of the arm thereon. The use of the frusto-conical thrust bearings rotatably mounted on the journal minimizes any wobble of the first arm during its pivotal movement.

Similarly, a thrust bearing 69 is rotatably positioned on the journal 64 of the extended end of the first arm, the sleeve 63 of the second arm 59 is fitted over the journal, a second thrust washer 67 is positioned in the opposite end of the sleeve, and the lock nuts 70 are tightened onto the journal to hold the sleeve and bearings in assembled relation thereon. In the same manner the journal at the extended end of the second arm is mounted in the sleeve 66 on the saw 44.

So assembled, the axes of pivotal movement of the saw on the second arm, the second arm on the first arm, and the first arm on the mounting plate are substantially parallel. In operation, the saw 44 is employed in the manner previously described with the arms dependably guiding the saw along a line of transversal of the work piece 14 predetermined by the rotational positioning of the mounting plate 24 on the base plate 18.

The arms of both forms of the invention dependably resist distortion which would permit the saw to depart from its intended track. They are compactly retracted when the saw is not in use and avoid the disposition of superstructure over the benches and the like on which they are mounted. The mountings are economical to produce, easy to install, light in weight and conveniently portable. The mountings of the present invention make possible substantially all of the advantages of radial saws at a nominal price.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A mounting, for a motor driven saw supported for slidable movement on a shoe and having a saw blade rotated in a plane in adjustable angular relation to the shoe and a handle for manipulating the saw, comprising a base plate adapted for mounting in fixed position, a mounting plate rotatably mounted on the base plate for movement about a substantially erect axis, clamp means mounted on the base plate engageable with the mounting plate releasably to hold the mounting plate in selected rotational position thereon, a pair of spaced ears upwardly extended from the mounting plate, a first substantially rectangular rigid arm having a bearing transversely of one end thereof fitted between the ears on the mounting plate and having a pair of axially aligned bearings transversely of the arm at the opposite end thereof spaced a distance substantially equal to the spacing of the ears on the mounting plate, a pin extended through the ears and the bearing of the first arm fitted therebetween in substantially parallel relation to the mounting plate and mounting the first arm for free pivotal movement thereon, a second arm having a bearing transversely on an end thereof fitted between the spaced bearings on the extended end of the first arm and a pair of axially aligned bearings transversely of the opposite end thereof, a second pin extended through the spaced bearings of the first arm and the bearing of the second arm fitted therebetween in substantially parallel relation to the first pin and mounting the second arm for free pivotal movement on the first arm, a bearing mounted on the shoe of the motor driven saw axially substantially parallel to the shoe fitted between the spaced bearings of the second arm, and a third pin extended through the spaced bearings of the second arm and the bearing mounted on the motor driven saw in substantially parallel relation to the first and second pins and mounting the shoe for free pivotal movement on the second arm.

2. A mounting, for a motor driven saw supported for slidable movement on a shoe having a saw blade rotated in a plane in adjustable angular relation to the shoe and a handle for manipulating the saw, comprising a base plate adapted for mounting in fixed horizontal position, a mounting plate rotatably mounted on the base plate for movement about a substantially erect axis, clamp means mounted on the base plate engageable with the mounting plate releasably to hold the mounting plate in selected rotational position thereon, a journal mounted on the mounting plate in spaced parallel relation thereto, a first rigid arm having an elongated rigid tubular body providing a sleeve transversely of an end thereof and a journal laterally extended from the opposite end thereof in substantial parallel relation to its sleeve, means pivotally mounting the sleeve of the first arm on the journal of the mounting plate for free pivotal movement thereon and with said arm upwardly extended therefrom, a second arm substantially identical to the first arm also having a sleeve transversely at an end of a rigid tubular body thereof and a journal laterally extended from the opposite end of the body in parallel relation to its sleeve, means rotatably mounting the sleeve of the second arm on the journal of the first arm for free pivotal movement thereon and with the second arm downwardly extended therefrom, a sleeve mounted on the shoe of the motor driven saw axially substantially parallel to the shoe, and means rotatably mounting the sleeve of the saw on the journal of the second arm for free pivotal movement in relation thereto.

3. A mounting, for a motor driven saw having a saw blade and a handle for manipulating the saw, adapted to apply the saw blade to a work piece along a line of work piece traversal of selected angularity relative to the work piece comprising a bench, a fence mounted on the bench adapted to receive a work piece on the bench thereagainst in predetermined position, a base plate mounted in fixed position on the fence substantially parallel to the bench, a substantially circular mounting plate rotatably mounted on the base plate in facing engagement therewith, clamp means mounted on the base plate engageable with the mounting plate releasably to hold the mounting plate in selected rotational position thereon, a pair of spaced ears upwardly extended from the mounting plate, a pair of articulately interconnected substantially identical arms of rigid material each of elongated rectangular form having a bearing transversely of one end of a length adapted to fit between the ears on the mounting plate and a pair of axially aligned bearings transversely at the opposite end thereof spaced a distance substantially equal to the spacing of the ears on the mounting plate, the single bearing at one end of a first arm being fitted between the ears, a substantially horizontal pin extended through said ears and the bearing therebetween and mounting the arms between the ears for free pivotal movement, the second arm having its single bearing fitted between the pair of bearings of the first arm in axial alignment with said bearings, a substantially horizontal pin extended through said axially aligned bearings and interconnecting the arms for free pivotal movement, a bearing mounted on the shoe of the motor driven saw fitted between the pair of axially aligned bearings of the second arm, and a substantially horizontal pin extended through the bearing on the motor driven saw and the pair of bearings on the arm interconnecting the saw and the second arm for free relative pivotal movement.

4. In combination with a motor driven saw having a saw blade rotatable in a plane in fixed relation thereto, a saw mounting for guiding the saw along adjustably predetermined lines of work piece traversal with the plane of the saw blade maintained in adjustably predetermined constant attitude during such traversal and with the saw gravitationally supported on the work piece during such traversal comprising a base plate adapted for mounting on a work piece supporting bench, a mounting plate rotatably mounted on the base plate, means for securing the mounting plate in adjusted rotatable position on the base plate, a first rigid arm mounted for free pivotal movement on the base plate and having an end extended therefrom, a second rigid arm mounted for free pivotal movement on the extended end of the first arm and in turn providing an end extended therefrom, a shoe adapted for slidable movement across a work piece mounted for free pivotal movement on the extended end of the second arm, the pivotal mounting of the first arm on the mounting plate, of the second arm on the first arm, and of the shoe on the second arm being on substantially parallel axes, and means mounting the saw on the shoe for adjustable pivotal movement in a plane substantially parallel to said pivotal axes.

5. In combination with a motor driven saw having a saw blade rotatable in a plane in fixed relation thereto, a saw mounting for guiding the saw along an adjustably predetermined line of work piece traversal with the plane of the saw blade maintained in adjustably predetermined constant angular relation to the work piece during traversal thereof and with the saw gravitationally supported on the work piece during such traversal comprising a base plate adapted for mounting in a substantially horizontal position on a bench for supporting a work piece to be sawed in a predetermined position on the bench, a mounting plate rotatably mounted on the base plate for adjustment about a substantially vertical axis, means for releasably securing the mounting plate in adjusted rotatable position on the base plate, a first rigid arm mounted for free pivotal movement about a substantially horizontal axis on the base plate and having an end upwardly extended therefrom, a second rigid arm mounted for free pivotal movement about a substantially horizontal axis on the extended end of the first arm and in turn providing an end extended downwardly therefrom, a shoe adapted for slidable movement across a work piece mounted for free pivotal movement about a substantially horizontal axis on the extended end of the second arm whereby the shoe may be caused to traverse a path over the work piece in a plane normal to the pivotal axes while slidably supported on the work piece, the pivotal mounting of the first arm on the mounting plate, of the second arm on the first arm, and of the shoe on the second arm being on substantially parallel axes, means mounting the saw on the shoe for adjustable pivotal movement about an axis substantially parallel to the plane of the path of movement of the shoe, and means for releasably locking the saw in adjusted pivotal position on the shoe.

References Cited in the file of this patent

UNITED STATES PATENTS

| | | |
|---|---|---|
| 2,389,296 | Crane | Nov. 20, 1945 |
| 2,556,137 | Emmons | June 5, 1951 |
| 2,596,524 | Bridwell | May 13, 1952 |
| 2,602,474 | Truchan | July 8, 1952 |